G. H. DAVIS.
ORE SEPARATOR.
APPLICATION FILED JULY 2, 1912.
1,175,616.
Patented Mar. 14, 1916.
2 SHEETS—SHEET 1.
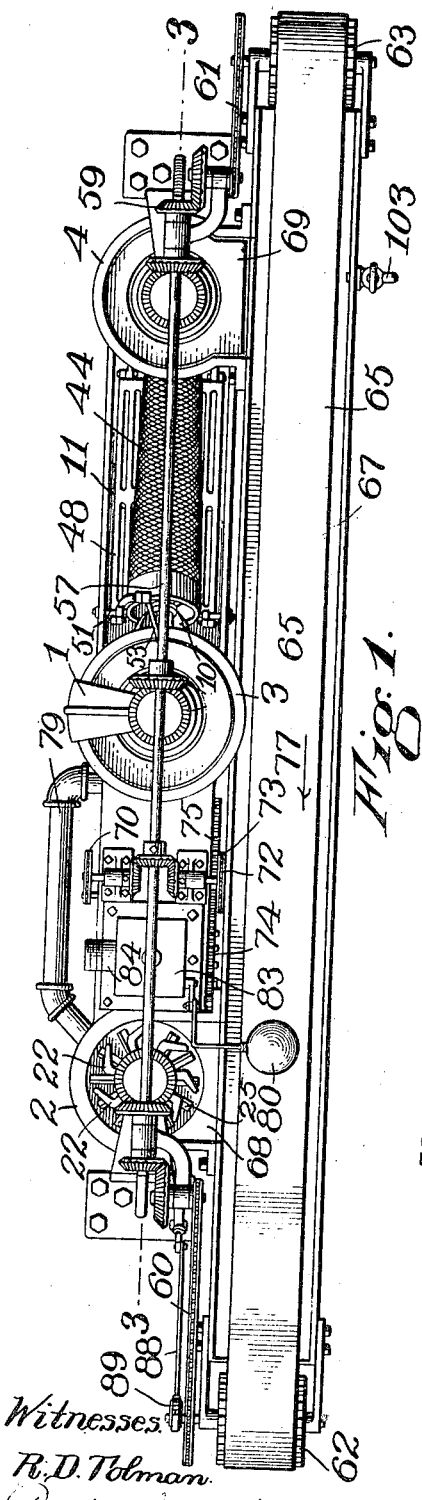
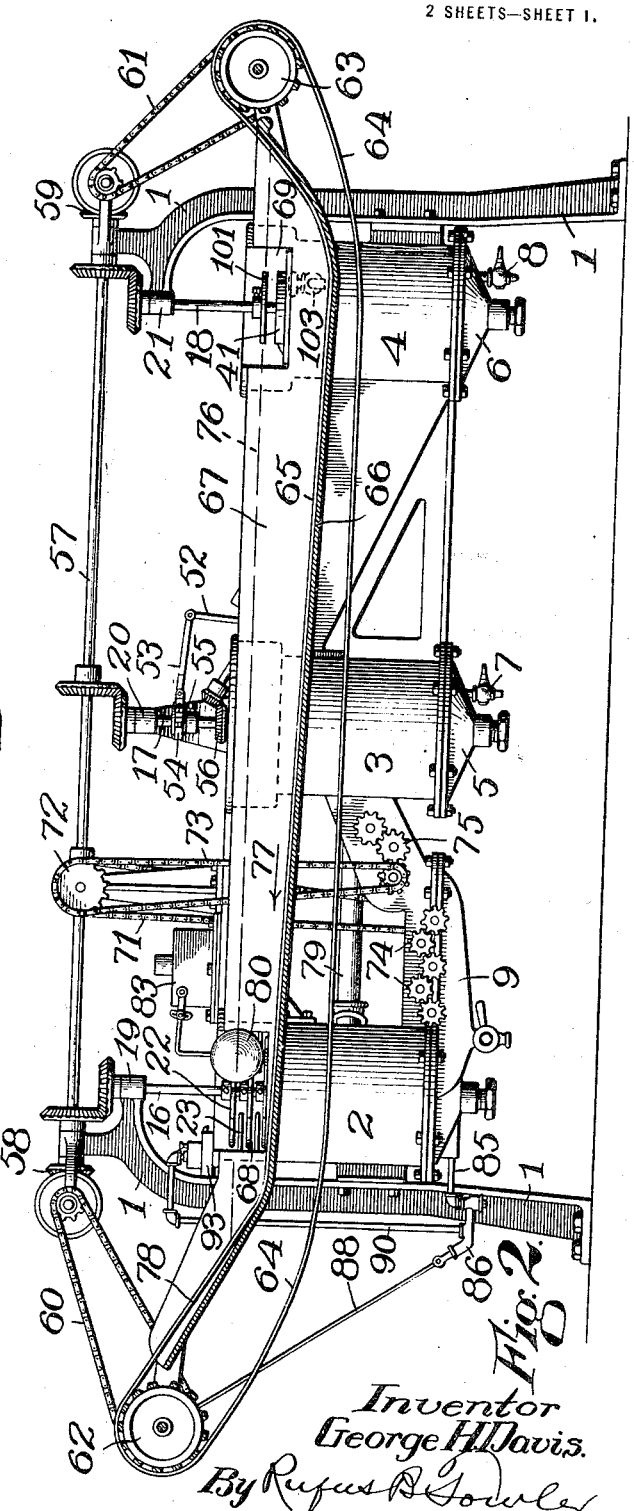
Witnesses
R. D. Tolman
Inventor
George H. Davis.
By Rufus A. Fowler
Attorney

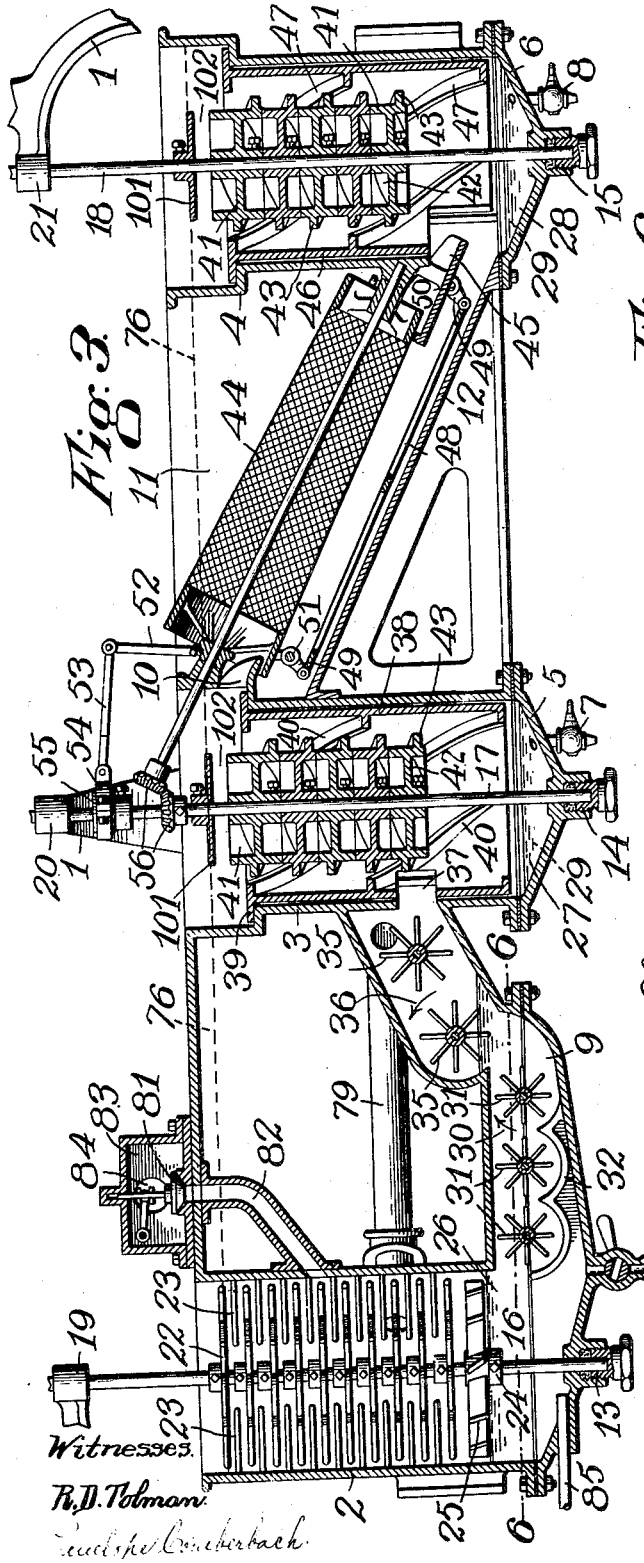

UNITED STATES PATENT OFFICE.

GEORGE H. DAVIS, OF WORCESTER, MASSACHUSETTS, ASSIGNOR TO AMERIGE-DAVIS MACHINE COMPANY, OF BOSTON, MASSACHUSETTS, A CORPORATION OF MAINE.

ORE-SEPARATOR.

1,175,616.  Specification of Letters Patent.  Patented Mar. 14, 1916.

Application filed July 2, 1912. Serial No. 707,163.

*To all whom it may concern:*

Be it known that I, GEORGE H. DAVIS, a citizen of the United States, residing at Worcester, in the county of Worcester and Commonwealth of Massachusetts, have invented a new and useful Improvement in Ore-Separators, of which the following is a specification, accompanied by drawings forming a part of the same.

The objects of my invention are to provide improved means for disintegrating the dirt and forcing it into contact with the mercury, and also to provide an improved washing and screening mechanism, and I accomplish these objects by the construction and arrangement of parts as hereinafter described, the novel features being pointed out in the annexed claims.

Referring to the accompanying drawings, Figure 1 is a plan view of my improved amalgamator. Fig. 2 is a side view partly in section. Fig. 3 is a central longitudinal sectional view. Fig. 4 is a detached view of the pumping mechanism for circulating the mercury through a cleansing medium. Fig. 5 is a detached perspective view of one of the sections of the spiral elevator. Fig. 6 is a plan view shown in section on the plane of the broken line 6—6, Fig. 3.

Similar reference characters refer to similar parts in the different figures.

Referring to the drawings, 1 denotes a framework upon which the operative parts of the machine are mounted. Supported in the framework are three vertical cylinders 2, 3 and 4, each open at the top. The cylinders 3 and 4 are provided with hopper shaped bottoms 5 and 6 preferably provided with pet cocks 7 and 8. The bottom of the cylinder 2 is connected by an inclosed passage 9 with the cylinder 3 at a point some distance above the bottom of the latter cylinder, and the top of the cylinder 3 communicates through a spout 10 with a water space 11 having an inclined bottom 12. The water space 11 communicates with the bottom of the cylinder 4. Each of the cylinders 2, 3 and 4 is provided with step bearings 13, 14 and 15 for the vertical shafts 16, 17 and 18 supported near their upper ends in bearings 19, 20 and 21 in the framework of the machine. The vertical shaft 16 carries a series of hooked shaped arms 22 vertically spaced on the shaft 16, and between the hook shaped arms 22 are the fixed radial bars 23 held by and projecting inwardly from the cylinder 2. Attached to the shaft 16 near its lower end is a hub 24 provided with radial blades 25 which are slightly inclined from the vertical for the purpose hereinafter described.

The bottom of the cylinder 2 and the passage 9 are filled with mercury 26 up to and in contact with the under sides of the blades 25. The lower ends of the cylinders 3 and 4 are provided with hopper shaped bottoms 5 and 6 inclosing chambers 27 and 28 which are filled with mercury 29. Rotating in the passage 9, all in the direction of the arrow 30, are the three paddle wheels 31 and projecting from the vertical sides of the passage 9 are flanges 32 and 33 having a narrow gap 34 between them. The flanges 32 and 33 are curved concentrically with each of the paddle wheels 31. In the upper portion of the passage 9 are the paddle wheels 35 rotating in the direction of the arrow 36, or in an opposite direction to the paddle wheels 31. The material which is transferred through the passage 9 is delivered into the cylinder 3 through an opening 37 about one third of the distance from the bottom of the cylinder 3. Within the cylinder 3 is an inclosed cylinder 38 forming a lining for the cylinder 3 and supported on the top of the cylinder 3 by means of a flange 39. The inner wall of the lining cylinder 38 is provided with spaced spiral ribs 40.

Attached to the vertical shaft 17 are a series of tubular sections 41 provided with inclosed spiral blades 42, 42, and the outer periphery of the tubular sections is provided with spiral blades 43, 43. When the sections 41 are brought together and attached to the shaft 17, the inner spiral blades 42 form a continuous spiral throughout the entire series of tubular sections. The spiral blades 43 also form a continuous spiral thread around the outer side of the tubular sections 41. The shaft 17 is rotated in the proper direction to cause any material acted upon by the inner blades 42 to be moved downward and any material acted upon by the outer blades 43 to be moved upward. Any material moved upwardly will be delivered through the spout 10 into the rotating screen 44, consisting of a rotating cylinder inclosed in wire cloth and having a mesh of suitable size to allow the finer particles of material to sift through the screen and fall upon the inclined bottom 12. The coarser material will be delivered through the lower end of the screen onto a delivery spout 45 which enters through an opening in the side of the cylinder 4. The cylinder 4 is provided with an interior or lining cylinder 46 having interior spiral ribs 47. Attached to the vertical shaft 18 are tubular sections 41, duplicates of those attached to the shaft 17 and shown in perspective view in Fig. 5, and provided with interior spiral blades 42 and exterior spiral blades 43, the operative mechanism in the cylinders 3 and 4 being substantially duplicates of each other.

A short distance above the inclined bottom 12 is a grid 48, having its ends pivotally attached to radial arms 49, 49 held on rocking shafts 50 and 51. The rocking shaft 51 has a vertical arm 52 pivotally connected by a link 53 with an eccentric strap 54 inclosing an eccentric 55 carried on the vertical shaft 17. The screen 44 is rotated through a pair of beveled gears 56 from the vertical shaft 17. The vertical shafts 16, 17 and 18 are driven by beveled gears from a common driving shaft 57, Fig. 2, to which power may be imparted from any suitable source. The driving shaft 57 through the bevel gears 58 and 59 and chain belts 60 and 61 will drive at uniform speed the drums 62 and 63 which carry an endless belt 64. The upper portion 65 of the belt slides along upon the bottom 66 of a pan 67 which communicates near one end with the cylinder 2 through an opening 68 and near its opposite end with the cylinder 4 through an opening 69.

A sprocket wheel 70 having a geared connection with the driving shaft 57 drives through a chain belt 71 the paddle wheels 31, and a sprocket wheel 72 having a geared connection with the driving shaft 57 through a chain belt 73 drives the paddle wheels 35. The shafts of the paddle wheels 31 are geared together through intermediates 74, Fig. 2, to cause the paddle wheels to rotate in the same direction, and the shafts of the paddle wheels 35 are connected through an intermediate gear 75 to cause the paddle wheels to revolve in the same direction.

In the operation of the machine the apparatus is filled with water up to the water line 76, Figs. 2 and 3, thereby filling the cylinders 2 and 4 above the openings 68 and 69 which admit water to the pan 67. Motion is imparted to the operative parts of the machine and dirt containing gold is supplied to the top of the cylinder 2 within which it is carried around by the hooked arms or agitators 22, moving the material against the fixed bars 23 and breaking up the lumps as the material settles to the bottom of the cylinder. When the dirt has passed vertically through the cylinder 2 and lodged upon the surface of the mercury 26, it is pressed downward by the scraping action of the inclined blades 25 and forced into the body of the mercury. A movement is given to the conglomerate mass of dirt by the agitation of the paddle wheels 31 rotating in the direction of the arrow 30. The mercury which may be carried up by the paddle wheels 31 falls by gravity through the gap 34 upon the inclined bottom of the passage 9. The dirt which has a tendency to accumulate in the upper portion of the mass of mercury, owing to its lighter specific gravity, is forced out of the mass of mercury and moved forward over the cylinder 3 by means of the paddle wheels 35 rotating in the direction of the arrow 36.

In the cylinder 3 the dirt accumulates in the bottom of the cylinder until it becomes subjected to the action of the exterior blades 43, by which it is forced upwardly and delivered through the spout 10 into the rotating screen 44. As the dirt is forced upwardly by the exterior screw blades 43, water flows downwardly through the interior of the tubular sections to supply the space from which the dirt has been removed, thereby producing a circulation of water throughout the cylinder 3. The agitation of the dirt throughout the moving mass of water in the cylinder 3 allows the gold which may still remain in the dirt to fall by its greater weight to the bottom of the cylinder and be caught by the mercury 29 held in the hopper shaped bottom 5.

As the dirt passes through the rotating screen 44, the finer particles pass through the meshes of the screen and fall upon the inclined bottom 12. The accumulation of material upon the inclined bottom 12 is gradually worked down toward the bottom of the cylinder 4 by the reciprocating motion given to the grid 48 by means of the vertical arm 52 and eccentric 55. The coarser particles of material delivered through the spout 45 together with that received from the inclined bottom 12 accumulate in the cylinder 4 until they become subjected to the elevating action of the exterior screw blades 43, by which they are raised and delivered through the opening 69 into the pan 67 where they are moved forward in the direction of the arrow 77 by the movement of the belt 65. The material resting upon the belt 65, known as "tailings", is carried up the incline 78 and delivered over the top of the drum 62.

The cylinder 2 has a communication with the passage 9 through a pipe 79 which enables the water to be maintained upon the same level throughout the apparatus as in the cylinder 2. The level of the water upon the line 76 is controlled by a float 80, Figs.

1 and 2, which rests upon the water in the pan 67. The float 80 is connected in the usual manner with a valve 81, Fig. 3, which closes a passage 82 connecting the cylinder 2 with a valve box 83 connected through a pipe 84 with a source of water supply.

As the continued use of the mercury in the apparatus causes it to be impregnated with impurities of different kinds, I provide means for the cleansing of the mercury by means of an apparatus shown in Fig. 2 and in detail in Fig. 4. The mercury cleansing apparatus comprises a pipe 85 communicating with the mass of mercury at the bottom of the cylinder 2. The pipe 85 communicates with a pump comprising a cylinder 86 and a sliding pump piston 87 connected by a rod 88 with an eccentric 89, Fig. 1, carried on the shaft of the drum 62. A vertical pipe 90 leads from the pump cylinder 86 and empties at its upper end into a box 91 which is open at the bottom and immersed in a mass of mercury 92 held in a tray 93.

The tray 93 is provided at one side with a spout 94 through which an excess of mercury in the tray 93 is permitted to flow into the top of the cylinder 2. The box 91 is filled with any suitable mercury cleansing medium such, for example, as cyanid of potassium 95 through a funnel shaped spout 96. The passageway between the pipe 85 and the pipe 90 is controlled by two check valves 97 and 98, so that the action of the pump piston 87 in its outward movement will draw the mercury through the pipe 85 in the direction of the arrow 99, and by the inward movement of the piston will force the mercury upward through the pipe 90 in the direction of the arrow 100.

The vertical shafts 17 and 18, on which the screw threaded elevating sections 41 are carried, are provided near their upper ends with disks 101, 101, adjustably attached to the shafts 17 and 18. The diameter of these disks is sufficient to cover the interior of the tubular sections 41. By adjusting the disks 101 on the shafts 17 and 18, the space 102 between the disks and the tubular sections can be increased or diminished at will, thereby regulating the downward flow of water through the tubular sections 41.

The pan 67, within which the water level is controlled by means of the float 80, is provided on one side and below the water line 76, with a valve closed outlet pipe 103 by which water may be drawn from the pan when it becomes too muddy for efficient use. The withdrawal of muddy water through the pipe 103 will be immediately supplied by clean water through the supply pipe 84 and valve box 83.

I claim:

1. In an ore separator, the arrangement for conjoint action of an amalgamating section, a washing section and a screening section, an inclosed passage leading from the bottom of the amalgamating section to the screening section, with a portion of said passageway completely filled with mercury, means for agitating the mercury in said passage, and means for establishing a communication between the top of the amalgamating section and the top of the screening section below the water line.

2. In an ore separator comprising a series of vertical cylinders arranged for conjoint action, means for maintaining a common water level in said cylinders, a pan extending longitudinally at the side of said cylinders and communicating with the upper end of the first and last cylinders of the series below the water line, and means for moving dirt from one end of said pan to the other.

3. In an ore separator, a series of vertical cylinders arranged for conjoint action, means for moving dirt fed to the first cylinder from the bottom of said cylinder to the bottom of the next cylinder, means for moving dirt from the bottom of the second cylinder to its top, and thence to the bottom of the next succeeding cylinder, a pan arranged lengthwise said cylinders and communicating with the upper ends of the first and last cylinders in said series, means for delivering dirt from the last cylinder in said series to said pan, means for moving the dirt lengthwise said pan, and means for intermingling the dirt received in the first of said cylinders with mercury during its movement between the first and second of said cylinders.

4. In an ore separator, a series of vertical communicating cylinders arranged in a row for conjoint action, means for moving dirt successively through said cylinders, means for maintaining a common water level in said cylinders, a horizontal pan extending lengthwise at the side of said cylinders and communicating with the first and last cylinders in said series below the water line, and means for moving dirt from the end of said pan opposite the last cylinder and delivering it from the opposite end of the pan.

5. In an ore separator, the arrangement for conjoint action of an amalgamating section, a washing section and a screening section, means for maintaining a common water line in said sections, means for moving dirt successively through said sections, a horizontal water pan extending lengthwise at the side of said sections and communicating with the top of the first and last sections below the water line, and means for moving dirt from one end of said pan and delivering it from the opposite end of the pan.

6. In an ore separator, an amalgamating section, a washing section and a screening section, each comprising a vertical cylinder arranged for conjoint action, means for moving dirt successively through said cylinders from the top of the first to the top of the last, a horizontal pan communicating at one end with the top of the first and last cylinders, and a movable belt for delivering dirt from the opposite end of said pan.

7. In an ore separator comprising a series of vertical cylinders arranged for conjoint action, means for moving dirt successively through said series from the top of the first to the top of the last cylinder, a horizontal pan communicating with the top of the first and last cylinders of said series of cylinders and having inclined ends, an endless belt, and means for moving said belt over the bottom and inclined ends of said pan.

8. In an ore separator, the arrangement for conjoint action of an amalgamating section, a washing section and a screening section, a pan extending lengthwise the apparatus and communicating with said amalgamating and said screening sections, and means for maintaining a water level in said sections above the plane of the connection between said pan and said amalgamating and screening sections.

Dated this 26th day of June, 1912.

GEORGE H. DAVIS.

Witnesses:
PENELOPE COMBERBACH,
NELLIE WHALEN.

Copies of this patent may be obtained for five cents each, by addressing the "Commissioner of Patents, Washington, D. C."